United States Patent Office

3,312,389
Patented Apr. 4, 1967

3,312,389
AIR BLOWER DEVICE WITH SILENCER
Masayuki Matsui, Tokyo, Japan, assignor to Fukuo
Saeki, Fujisawa, Kanagawa, Japan
Filed Apr. 29, 1965, Ser. No. 451,771
Claims priority, application Japan, May 4, 1964,
39/25,184
8 Claims. (Cl. 230—233)

This invention relates to an air blower device including a silencer.

In the conventional type of air blower device comprising a rotor having mounted on the periphery thereof a plurality of radial blades and rotatably disposed within an operating chamber of substantially spiral shape, a stream of air introduced into the operating chamber is impelled radially toward the internal peripheral wall surface of the chamber and impinges on the wall surface. After having rebounded from the internal peripheral wall surface of the chamber, the stream of air under pressure is progressively conveyed toward a common discharge port. This results in a tendency for such air blower devices to generate noise. It is very desirable to eliminate or minimize such noise.

It is, accordingly, an object of the invention to substantially eliminate or minimize noise generated in an air blower device of the type above described.

It is another object of the invention to provide a simple and robust structure for a silencer incorporated into an air blower device of the type described in construction.

With the aforesaid object in view, the invention resides in an air blower device comprising a rotor member having mounted on the periphery thereof a plurality of radial blades and rotatably disposed in an operating chamber of substantially spiral cross-section, a smooth, porous screen defining the internal peripheral wall surface of the operating chamber and a sound absorbing layer disposed on that side of the screen opposite to the rotor member and spaced from said screen to define a buffer air gap.

The invention will become more readily apparent from the following detailed description in conjunction with the accompanying drawings wherein.

Throughout the figures, the same reference numerals designate the corresponding or similar components.

Figure 1:
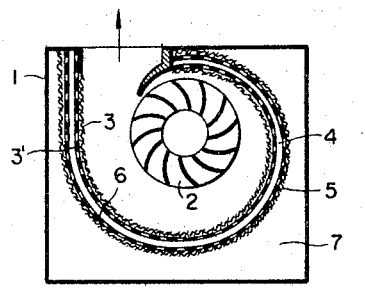
FIG. 1 is a diagrammatic view, in cross-section of an air blower device constructed in accordance with the teachings of the invention.

Referring now to FIG. 1, there is illustrated an air blower device constructed in accordance with the teachings of the invention. The arrangement illustrated comprises a housing 1 having a cross-sectional profile in the form of a substantially square shape and a rotor member 2 having mounted on its periphery a plurality of radial blades. The rotor member 2 is of the conventional design and is disposed within an operating chamber formed in the housing 1 to provide between the external peripheral surface thereof and the internal peripheral wall surface of the chamber a substantially spiral passageway similar in shape to that in the conventional air blower. The rotor is adapted to be rotated in a predetermined direction by a drive (not shown) to produce a flow of air under pressure through the spiral passageway in a manner well known in the art until the flow of air is discharged in the direction of the arrow shown in FIG. 1.

According to the teachings of the invention, the internal peripheral wall surface in the form of a spiral cross-section of the chamber 1 facing the rotor member 2 includes a porous screen 3 having a suitable permeability and composed of any suitable flexible material having a smooth surface or exhibiting a relatively low resistance to a flow of air through the screen. The screen 3 may be preferably composed of a glass fiber fabric. In order to maintain the screen 3 in place against the air pressure due to the rotating rotor member 2, the screen 3 has positioned against it a stiffening apertured plate 3 having a high open area ratio and a mechanical strength sufficient to withstand the high pressure of air generated in the spiral passageway during operation. The stiffening plate 3' may be conveniently a sheet of iron suitably apertured as by punching.

Formed behind the composite screen 3–3' or on that side thereof remote from the rotor member 2 is a buffer air gap 4 defined by the stiffening plate 3' and an apertured plate 5 similar in cross-sectional profile to the stiffening plate 3' and spaced therefrom. It will be seen that the air gap has a cross-sectional profile of a spiral shape. The apertured plate 5 is provided on the outer surface or that surface remote from the composite screen with a sound absorbing layer shown as a cloth 6. Formed between the cloth 6 and the internal wall of the housing 1 is an air space 7 serving to absorb sound.

Figure 2:
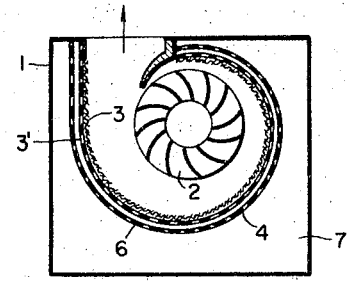
FIG. 2 is a view similar to FIG. 1 but illustrating a modification which is somewhat simplified in structure.

The arrangement shown in FIG. 2 is substantially similar to that illustrated in FIG. 1 excepting that the cloth 5 is omitted.

Figure 3:
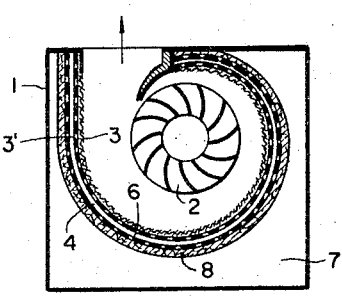
FIG. 3 is a diagrammatic view, in cross-section, of another embodiment of the invention.

The arrangement shown in FIG. 3 is substantially similar to that illustrated in FIG. 1 excepting that the cloth 5 is replaced by a layer 8 of any suitable porous sound-absorbing material such as glass wool, rock wool, foamed urethane or the like having an appropriate thickness.

Figure 4:
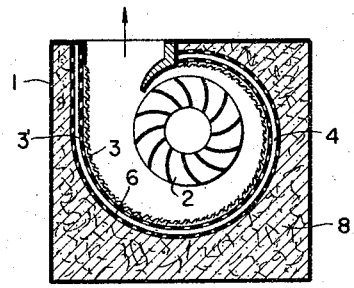
FIG. 4 is a diagrammatic view, in cross-section, of a modification of the device illustrated in FIG. 2.

The arrangement shown in FIG. 4 is substantially similar to that illustrated in FIG. 2 except that the space 7 is filled with any suitable porous sound-absorbing material 8 which may be the same as the material 8 shown in FIG. 3.

Figure 5:
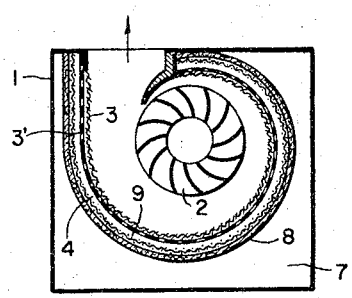
FIG. 5 is a diagrammatic view, in cross-section, of a modification of the device illustrated in FIG. 3.

The arrangement shown in FIG. 5 is substantially similar to that illustrated in FIG. 3 excepting that the apertured sheet 5 is replaced by a stiffening plate 9 having a layer 8 of any suitable porous sound absorbing material disposed on the outer face thereof or that face thereof remote from the composite screen 3–3'.

Figure 6:
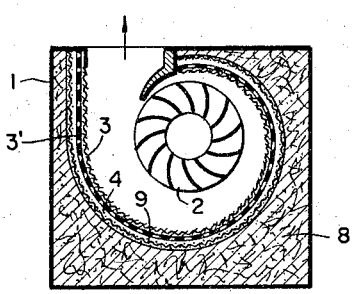
FIG. 6 is a diagrammatic view, in cross-section, of a modification of the device illustrated in FIG. 5.

The arrangement shown in FIG. 6 is substantially similar to that illustrated in FIG. 5 except for the space between the reinforcing sheet 9 and the internal wall of the housing 1 being filled with any suitable porous sound absorbing material 8.

It is essential that the screen 3 should be disposed in the form of a spiral shape between the rotor member 2 and the buffer gap 4. That boundary of the gap 4 remote from the screen 3 may be defined by any suitable sound absorbing member.

It will be appreciated that angled corners formed on the internal wall surface of the housing 1 are effective for absorbing particularly low frequencies of sound waves even in the absence of a sound absorbing material filling the space 7.

The stiffening plate 3' associated with the screen 3 may be preferably composed of an apertured sheet of iron having a thickness of from 1 to 2 mm. and an open area ratio of 60% or more. The apertured plate 6 may be advantageously an apertured sheet of iron having a thickness of from 1 to 2 mm. and an open area ratio of from 10 to 20% because the plate has been provided for absorbing the resonance phenomena. A satisfactory result is obtained when the cloth 5 attached to the apertured plate 5 is a fabric made of glass fibers or the like and has a resistance to a flow of air through the same approximately ranging from 10 to 100 g./cm.²/sec. The figure of resistance above specified is substantially equal to that of bleached muslin or flannel.

The stiffening plate 9 is not required to have a high rigidity because the same serves only to maintain the internal and lateral sides of the sound absorbing material 8 in predetermined profiles. The plate 9 may conveniently be an apertured sheet of iron having a higher open area ratio than the apertured plate 5 or a metallic gauze.

In operation, a stream of air driven by the rotor member 2 impinges on the screen 3. However, due to its smoothness, flexibility and porosity, the screen 3 exerts a buffer action upon the stream of air impinging thereon and at the same time smoothly guiding the stream of air along the spiral surface thereof toward the discharge outlet of the blower.

Therefore it will be appreciated that the air blower of the invention performs an excellent sound-absorbing function with an extremely simple construction. For this reason, the invention is particularly suitable for use with ventilation facilities and air conditioners employed in buildings.

What I claim is:

1. In an air blower device comprising a rotor member having mounted on the periphery thereof a plurality of radial blades and rotatably disposed in an operating chamber having a substantially spiral cross-section, the combination of a smooth porous screen forming the internal peripheral wall surface of said operating chamber, and sound absorbing means disposed on that side of said screen remote from said rotor member and spaced from said screen to define a buffer air gap between said sound absorbing means and said screen.

2. In an air blower device comprising a rotor member having mounted on the periphery thereof a plurality of radial blades and rotatably disposed in an operating chamber having a substantially spiral cross-section, the combination of a composite permeable screen member including a porous screen element composed of a flexible material having a smooth surface and an apertured stiffening plate having a high open area ratio and attached to said screen element to stiffen the latter, said composite permeable screen forming the internal peripheral wall surface of said operating chamber, and sound absorbing means disposed on that side of said screen member remote from said rotor member and spaced from said screen member to define a buffer air gap between said sound absorbing means and said screen member.

3. An air blower device as claimed in claim 2, wherein said stiffening plate has an open area ratio of at least 60%.

4. An air blower device as claimed in claim 2, wherein said absorbing means includes an apertured plate having a cloth attached on that surface thereof remote from said composite screen member.

5. An air blower device as claimed in claim 2, wherein said absorbing means includes an apertured plate having a layer of sound absorbing material disposed on that surface thereof remote from said composite screen means.

6. An air blower device as claimed in claim 2, wherein said absorbing means includes a layer of sound absorbing material lined with a stiffening plate.

7. An air blower device as claimed in claim 2, wherein said air blower is mounted in a housing and said sound absorbing means includes an apertured plate and the air space defined by said apertured plate and the internal wall surface of said housing for the device.

8. An air blower device as claimed in claim 2, wherein said air blower is mounted in a housing and said sound means includes an apertured plate and a quantity of sound absorbing material filling the space defined by said apertured plate and the internal wall surface of said housing for the device.

References Cited by the Examiner

UNITED STATES PATENTS 3,174,682   3/1965   Wilfert et al. _____ 230—233

FOREIGN PATENTS 926,088   5/1963   Great Britain.

ROBERT M. WALKER, *Primary Examiner.*